United States Patent
Zhu et al.

(10) Patent No.: US 11,516,060 B2
(45) Date of Patent: *Nov. 29, 2022

(54) SYSTEM AND METHOD FOR GENERALIZED MULTI-CARRIER FREQUENCY DIVISION MULTIPLEXING

(71) Applicant: Huawei Technologies Co., Ltd., Shenzhen (CN)

(72) Inventors: Peiying Zhu, Kanata (CA); Jianglei Ma, Ottawa (CA); Ming Jia, Ottawa (CA); Wen Tong, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 146 days.

This patent is subject to a terminal disclaimer.

(21) Appl. No.: 16/654,092

(22) Filed: Oct. 16, 2019

(65) Prior Publication Data
US 2020/0052949 A1 Feb. 13, 2020

Related U.S. Application Data

(63) Continuation of application No. 16/017,743, filed on Jun. 25, 2018, now Pat. No. 10,454,740, which is a
(Continued)

(51) Int. Cl.
*H04L 27/26* (2006.01)
*H04L 5/00* (2006.01)
*H04L 25/03* (2006.01)

(52) U.S. Cl.
CPC ........ *H04L 27/2637* (2013.01); *H04L 5/0021* (2013.01); *H04L 5/0066* (2013.01);
(Continued)

(58) Field of Classification Search
CPC . H04L 27/2637; H04L 27/264; H04L 5/0021; H04L 5/0066; H04L 27/2602;
(Continued)

(56) References Cited

U.S. PATENT DOCUMENTS 7,251,457 B1 7/2007 Davi
2003/0050055 A1* 3/2003 Ting .................. H04M 3/42178
455/419
(Continued)

FOREIGN PATENT DOCUMENTS

CN 101465832 A 6/2009
CN 102160312 8/2011
(Continued)

OTHER PUBLICATIONS

Anderson, J.B., et al., "Faster-Than-Nyquist Signaling," Proceedings of the IEEE, vol. 101, No. 8, pp. 1817-1830, Aug. 2013.
(Continued)

*Primary Examiner* — Thai Nguyen
(74) *Attorney, Agent, or Firm* — Slater Matsil, LLP

(57) ABSTRACT

A method for operating a device includes determining adaptation criteria for a waveform to be transmitted by a transmitting device over a communications channel towards a receiving device, and adjusting a generalized multi-carrier multiplexing parameter (GMMP) of the waveform in accordance with the adaptation criteria. The method also includes transmitting an indicator of the adjusted GMMP to at least one of the transmitting device and the receiving device.

21 Claims, 9 Drawing Sheets

Related U.S. Application Data continuation of application No. 14/228,155, filed on Mar. 27, 2014, now Pat. No. 10,009,209.

(60) Provisional application No. 61/806,187, filed on Mar. 28, 2013.

(52) U.S. Cl.
CPC .... *H04L 27/2602* (2013.01); *H04L 27/26414* (2021.01); *H04L 27/26538* (2021.01); *H04L 25/03834* (2013.01); *H04L 27/2654* (2021.01); *H04L 27/26416* (2021.01)

(58) Field of Classification Search
CPC ............. H04L 25/03834; H04L 5/0017; H04L 5/0019; H04L 27/2642
See application file for complete search history.

(56) References Cited

U.S. PATENT DOCUMENTS

| | | | |
|---|---|---|---|
| 2003/0199266 A1* | 10/2003 | Zavidniak | H04M 1/72511 455/410 |
| 2004/0100897 A1* | 5/2004 | Shattil | H04L 27/2602 370/206 |
| 2005/0233752 A1 | 10/2005 | Laroia et al. | |
| 2007/0147226 A1 | 6/2007 | Khandekar et al. | |
| 2007/0195899 A1 | 8/2007 | Bhushan et al. | |
| 2008/0220757 A1* | 9/2008 | Zeller | H04B 1/005 455/418 |
| 2008/0253434 A1 | 10/2008 | March et al. | |
| 2009/0049159 A1* | 2/2009 | Boscovic | H04W 88/06 709/221 |
| 2009/0052405 A1 | 2/2009 | Ko et al. | |
| 2009/0135888 A1 | 5/2009 | Matolak | |
| 2010/0189132 A1 | 7/2010 | Fettweis et al. | |
| 2010/0265992 A1 | 10/2010 | Molina et al. | |
| 2011/0093900 A1 | 4/2011 | Patel et al. | |
| 2011/0216850 A1 | 9/2011 | Kishiyama et al. | |
| 2012/0014392 A1 | 1/2012 | Bhushan et al. | |
| 2013/0023201 A1* | 1/2013 | Coleman | H04K 3/42 455/1 |
| 2013/0051485 A1 | 2/2013 | Taori et al. | |
| 2014/0029680 A1* | 1/2014 | Ray | H04L 27/0008 375/259 |
| 2014/0153674 A1* | 6/2014 | Stratigos, Jr. | H04B 7/0885 375/340 |

FOREIGN PATENT DOCUMENTS

| | | |
|---|---|---|
| CN | 102882666 A | 1/2013 |
| EP | 2333996 A1 | 6/2011 |

OTHER PUBLICATIONS

"Spectrally Agile Multicarrier Waveforms of Opportunistic Wireless Access" by Boguka et al, IEEE Communications Magazine Jun. 2011.

Chakravarthy, V., et al., "Novel Overlay/Underlay Cognitive Radio Waveforms Using SD-SMSE Framework to Enhance Spectrum Efficiency—Part I: Theoretical Framework and Analysis in AWGN Channel," IEEE Transactions on Communications, vol. 57, No. 12, Dec. 2009, pp. 3794-3804.

Dasalukunte, D., et al., "Multicarrier Fater-Than-Nyquist Transceivers: Hardware Architecture and Performance Analysis," IEEE Transactions on Circuits and Systems—I: Regular Papers, vol. 58, No. 4, Apr. 2011, pp. 827-838.

Datta, R., et al., "FBMC and GFDM Interference Cancellation Schemes for Flexible Digital Radio PHY Design," 2011 14th Euromicro Conference on Digital System Design (DSD), Aug. 31-Sep. 2, 2011, pp. 335-339.

Farhang-Boroujeny, B., "OFDM Versus Filter Bank Multicarrier," IEEE Signal Processing Magazine, May 2011, pp. 92-112.

Fettweis, G., et al., "GFDM—Generalized Frequency Division Multiplexing," 69th IEEE Vehicular Technology Conference (VTC), Apr. 26-29, 2009, pp. 1-4.

Gharba, M., et al., "An Alternative Mulitple Access Scheme for the uplink 3GPP/LTE based on OFDM/OQAM," Wireless Communication Systems (ISWCS), 2010 7th International Symposium, Sep. 19-22, 2010, pp. 941-945.

Michailow, N. et al., "Generalized Frequency Division Multiplexing: A Flexible Multi-Carrier Modulation Scheme for 5th Generation Cellular Networks," Lund University: Electrical Information Technology, German Microwave Conference, Mar. 12-14, 2012, 5 pgs.

Nikopour, H., et al., "Sparse Code Multiple Access," Personal Indoor and Mobile Radio Communications (PIMRC), 2013 IEEE 24th International Symposium, Sep. 8-11, 2013, pp. 332-336.

Roberts, M.L., et al., "Communication Waveform Design Using an Adaptive Spectrally Modulated, Spectrally Encoded (SMSE) Framework," IEEE Journal of Selected Topics in Signal Processing, vol. 1, No. 1, Jun. 2007, pp. 203-213.

Alcatel-Lucent, et al., "Introduction of test requirements for MSR-NC in 37.141", 3GPP TSG-RAN WG4 Meeting #60, R4-114789, Aug. 22-26, 2011, 71 Pages, Athens, Greece.

Chakravarthy, V., et al., "Novel Overlay/Underlay Cognitive Radio Waveforms Using SD-SMSE Framework to Enhance Spectrum Efficiency—Part 1: Theoretical Framework and Analysis in AWGN Channel," IEEE Transactions on Communications, vol. 57, No. 12, Dec. 2009, pp. 3794-3804.

* cited by examiner

SYSTEM AND METHOD FOR GENERALIZED MULTI-CARRIER FREQUENCY DIVISION MULTIPLEXING

This application is a continuation of U.S. patent application Ser. No. 16/017,743, filed on Jun. 25, 2018, entitled "System and Method for Generalized Multi-Carrier Frequency Division Multiplexing," which is a continuation of U.S. patent application Ser. No. 14/228,155, now U.S. Pat. No. 10,009,209, filed on Mar. 27, 2014, entitled "System and Method for Generalized Multi-Carrier Frequency Division Multiplexing," which claims the benefit of U.S. Provisional Application No. 61/806,187, filed on Mar. 28, 2013, entitled "System and Method for Generalized Multi-Carrier Frequency Division Multiplexing," which applications are hereby incorporated herein by reference.

TECHNICAL FIELD

The present disclosure relates generally to digital communications, and more particularly to a system and method for generalized multi-carrier frequency division multiplexing.

BACKGROUND

Current radio access network solutions use a different transmitter/receiver for each different radio link access technology. A single currently available radio link access technology, however, is not able to meet the diverse requirements of future radio access. These requirements include different traffic types with different quality of service (QoS) requirements, different spectrum usage with different out-of-band leakage requirements, different applications serving different numbers of terminal equipment, different transmitter capabilities, different receiver capabilities, and the like.

SUMMARY OF THE DISCLOSURE

Example embodiments of the present disclosure which provide a system and method for generalized multi-carrier frequency division multiplexing.

In accordance with an example embodiment of the present disclosure, a method for operating a device is provided. The method includes determining, by the device, adaptation criteria for a waveform to be transmitted by a transmitting device over a communications channel towards a receiving device, and adjusting, by the device, a generalized multi-carrier multiplexing parameter (GMMP) of the waveform in accordance with the adaptation criteria. The method also includes transmitting, by the device, an indicator of the adjusted GMMP to at least one of the transmitting device and the receiving device.

In accordance with another example embodiment of the present disclosure, a method for operating a device is provided. The method includes specifying, by the device, a plurality of candidate waveforms for a communications system, wherein each candidate waveform is specified by selecting a value for at least one generalized multi-carrier multiplexing parameter (GMMP), and storing, by the device, the plurality of candidate waveforms in a memory.

In accordance with another example embodiment of the present disclosure, a method for operating a first device is provided. The method includes determining, by the first device, a first waveform assigned to a first cellular resource partition, wherein the first cellular resource partition is one of a plurality of cellular resource partitions including a second cellular resource partition and a third cellular resource partition, wherein the first waveform is the sole waveform determined based on and assigned to the first cellular resource partition, wherein the first waveform comprises first one or more waveform parameters, wherein a second waveform is the sole waveform determined based on and assigned to the second cellular resource partition, wherein a third waveform is the sole waveform determined based on and assigned to the third cellular resource partition, and wherein the first waveform, the second waveform, and the third waveform are different from one another. The method further includes transmitting, by first device, information associated with the first waveform to a second device. The method further includes communicating, by the first device with the second device, in the first cellular resource partition using the first waveform.

Optionally, the method may further include determining, by the first device, the second waveform assigned to the second cellular resource partition, wherein the second waveform comprises second one or more waveform parameters, transmitting, by the first device, information associated with the second waveform to a third device, and communicating, by the first device with the third device, in the second cellular resource partition using the second waveform.

Optionally, the method may further include determining, by the first device, the third waveform assigned to the third cellular resource partition, wherein the third waveform comprises third one or more waveform parameters, wherein the first cellular resource partition and the third cellular resource partition at least partially overlap in a time domain, and wherein the first cellular resource partition and the third cellular resource partition occupy different frequency bands.

Optionally, the method may further include determining, by the first device, the second waveform assigned to the second cellular resource partition, wherein the second waveform comprises second one or more waveform parameters, wherein the first cellular resource partition and the second cellular resource partition occupy different time slots, and wherein the first cellular resource partition and the second cellular resource partition at least partially overlap in a frequency domain.

In accordance with another example embodiment of the present disclosure, a device is provided. The device includes a processor, and a transmitter operatively coupled to the processor. The processor determines adaptation criteria for a waveform to be transmitted by a transmitting device over a communications channel towards a receiving device, and adjusts a generalized multi-carrier multiplexing parameters (GMMP) of the waveform in accordance with the adaptation criteria. The transmitter transmits an indicator of the adjusted GMMP to at least one of the transmitting device and the receiving device.

In accordance with another example embodiment of the present disclosure, a transmitter is provided. The transmitter includes a signaling frequency adjusting unit, a spreading factor adjusting unit operatively coupled to the signaling frequency adjusting unit, an overlay adjusting unit operatively coupled to the spreading factor adjusting unit, a plurality of digital pulse shaping filters operatively coupled to the overlay adjusting unit, and a combiner operatively coupled to the plurality of digital pulse shaping filters. The signaling frequency adjusting unit adjusts a signaling frequency of an input data stream to produce an adjusted data stream. The spreading factor adjusting unit spreads the adjust data stream over a plurality of sub-carriers to produce sub-carrier data streams. The overlay adjusting unit generates data layers from the sub-carrier data streams. Each digital pulse shaping filter upsamples and filters one of the data layers to produce a filtered data layer. The combiner merges the filtered data layers to produce output data.

In accordance with another example embodiment of the present disclosure, a receiver is provided. The receiver includes a plurality of digital pulse shaping filters, a parallel to serial unit operatively coupled to the plurality of digital pulse shaping filters, a decoder operatively coupled to the parallel to serial unit. Each digital pulse shaping filter demodulates, downsamples, and filters one of a plurality of data sub-carriers of an input data to produce a filtered sub-carrier data stream. The parallel to serial unit serializes the filtered sub-carrier data stream producing a serialized data stream. The decoder generates output data from the serialized data stream.

In accordance with another example embodiment of the present disclosure, a communications system is provided. The communications system includes an evolved NodeB (eNB), and a designing device operatively coupled to the eNB. The eNB controls communications to and from a user equipment (UE), the eNB supports a plurality of candidate waveforms for a communications channel between the eNB and the UE, where each candidate waveform is specified by selecting a value of at least one generalized multi-carrier multiplexing parameter (GMMP). The designing device selects one of the plurality of candidate waveforms to be transmitted by a transmitting device over a communications channel towards the UE in accordance with adaptation criteria of the waveform.

One advantage of an embodiment is that adapting parameters of a generalized multi-carrier frequency division multiplexing communications system permits diverse requirements (such as traffic type, spectrum usage, applications, transmitter capability, receiver capability, and the like) to be met by a single communications system.

A further advantage of an embodiment is that communications equipment with different capabilities and/or requirements can be well supported by a single communications system.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to generalized multi-carrier frequency division multiplexing. For example, a device determines adaptation criteria for a communications channel between a transmitting device and a receiving device, adapts generalized multi-carrier multiplexing parameters (GMMP) of the communications channel in accordance with the adaptation criteria, and transmits an indicator of the GMMP to at least one of the transmitting device and the receiving device.

The present disclosure will be described with respect to example embodiments in a specific context, namely a multi-carrier communications system that adapts to different communications equipment capabilities and/or requirements by selecting values for waveform parameters. The disclosure may be applied to standards compliant multi-carrier communications systems, and non-standards compliant communications systems, that are capable of adapting to different communications equipment capabilities and/or requirements by selecting values for waveform parameters.

Figure 1:
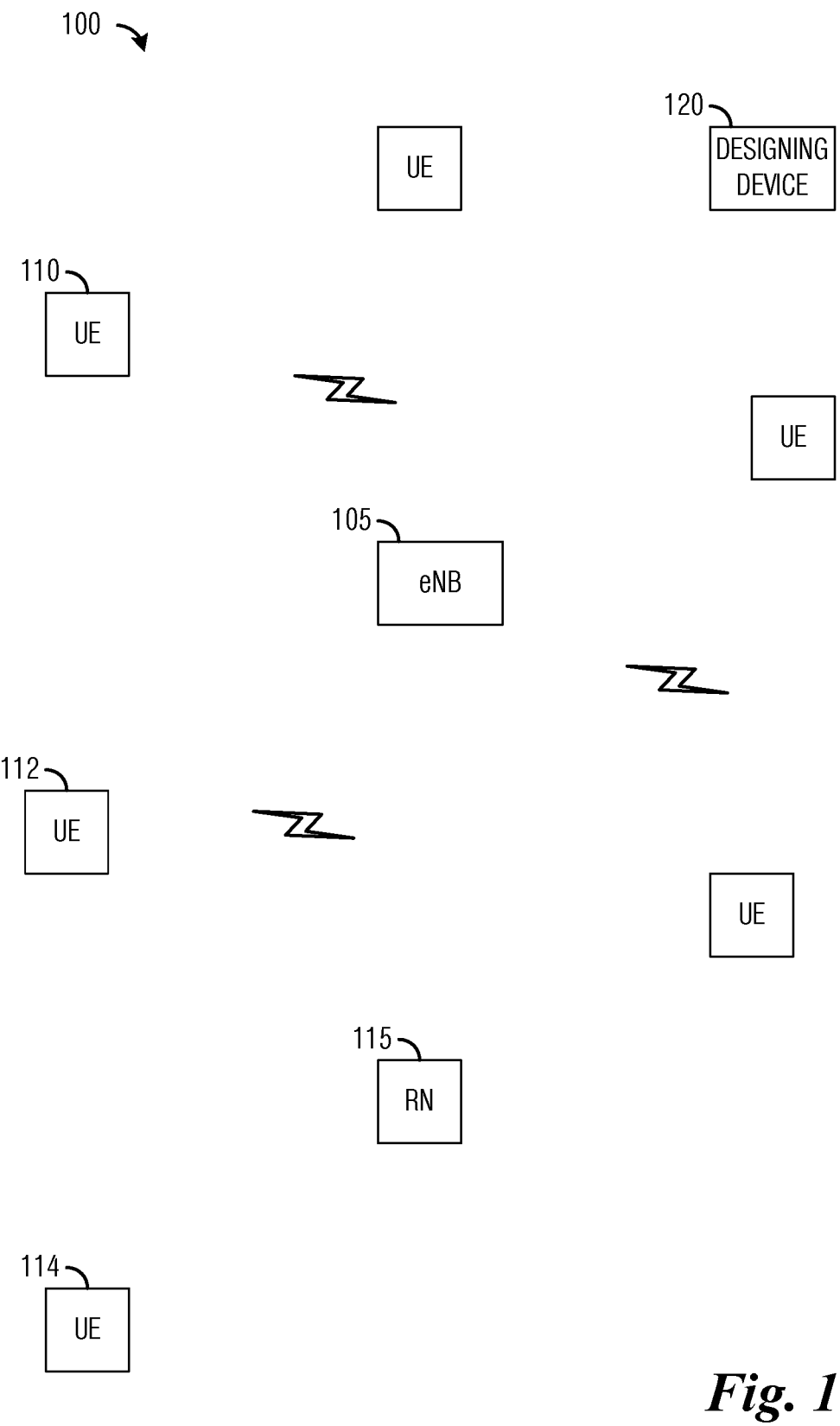
FIG. 1 illustrates an example communications system according to example embodiments described herein.

FIG. 1 illustrates an example communications system 100. Communications system 100 includes an evolved NodeB (eNB) 105 that serves a plurality of user equipment (UE), such as UE 110, UE 112, and UE 114. In a first communications mode, communications to a UE or from a UE typically goes through an eNB. In a second communications mode, a first UE may be capable of directly communicating with a second UE without having an eNB serve as a go between. An eNB may also be commonly referred to as a NodeB, base station, communications controller, controller, and the like. Similarly, a UE may also be commonly referred to as a mobile station, mobile, subscriber, terminal, user, and the like. Communications system 100 may include a relay node (RN) 115. A RN may be used to improve coverage in a poor coverage area of a communications system or help to improve overall performance. A RN utilizes bandwidth allocated to it by an eNB, and may appear as an eNB to UE that it is serving.

A designing device 120 may be used to select a waveform for transmission of a transmitting device(s) and receiving device(s) group. The selection of the waveform may be in accordance with adaptation criteria. A detailed discussion of example embodiments for selection of the waveform is provided below. Designing device 120 may be a stand-alone device in communications system 100. Designing device 120 may be co-located with another device in communications system 100, such as an eNB, an RN, a UE, and the like.

While it is understood that communications systems may employ multiple eNBs capable of communicating with a number of UEs, only one eNB, one RN, and a number of UEs are illustrated for simplicity.

Even within communications equipment of a single generation, the capabilities and/or requirements of the communications equipment may differ. As an illustrative example, a first 5G UE may be a desktop computer with 5G wireless access capable of running a wide range of applications, such as file transfer, web browsing, multimedia consumption in high definition, social media, multimedia server in high definition, and the like. Many of these applications have different requirements, some need low latency, while others have higher bandwidth requirements. While a second 5G UE may be a high definition display that only is a consumer of high definition multimedia, and a third 5G UE may be a machine-type device (MTD) or a sensor that has limited data communications requirements, but has strict power consumption requirements in order to extend the life of a hard-to-change battery. Therefore, a 5G communications system may have to meet a diverse range of requirements and/or capabilities.

Figure 2:
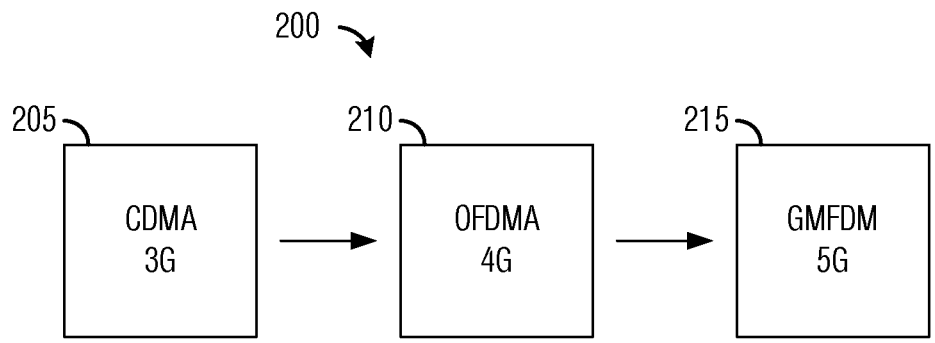
FIG. 2 illustrates a diagram highlighting an example progression of wireless communications system technology standards according to example embodiments described herein.

FIG. 2 illustrates a diagram 200 highlighting an example simplified progression of wireless communications system technology standards. As shown in FIG. 2, code division multiple access (CDMA) 205 is a 3G wireless communications system technology standard and orthogonal frequency division multiple access (OFDMA) 210 is a 4G wireless communications system technology standard. In general, each wireless communications system technology standard has been optimized to serve one or more intended services. As an example, CDMA 205 was designed to maximize the number of voice calls, at the same time, providing mobile data support such as Email and web access, while OFDMA 210 was designed to best support mobile broadband applications. It is envisioned that a 5G wireless communications system technology standard will support many diverse services, applications, and usage scenarios with a wide range of performance requirements. Therefore, it is may be difficult to design a single waveform that is optimized for all services and/or scenarios.

In sparse code multiple access (SCMA), data is spread over multiple time-frequency tones of OFDMA resources through multi-dimensional codewords. Sparsity of codewords helps to reduce the complexity of joint detection of multiplexed SCMA layers by using message passing algorithm (MPA). Each layer of SCMA has an associated codebook set. Low density spreading (LDS) is a special case of SCMA. Low density signature (LDS) as a form of multicarrier CDMA (MC-CDMA) is used for multiplexing different layers of data. As opposed to SCMA with multidimensional codewords, LDS uses repetitions of the same quadrature amplitude modulated (QAM) symbol on layer-specific nonzero position in time or frequency. As an example, in LDS-orthogonal frequency division multiplexing (LDS-OFDM) a constellation point is repeated (with some possible phase rotations) over nonzero frequency tones of a LDS block.

SCMA is an encoding technique that encodes data streams, such as binary data streams, or in general, M-ary data streams, where M is an integer number greater than or equal to 2 into multidimensional codewords. SCMA may lead to coding gain over conventional CDMA encoding and LDS. SCMA encoding provides multiple access through the use of different codebooks for different multiplexed layers, where the multiple layers can be used by same user or different users. SCMA may be able to support large numbers of active connections due to its overloading capability where multiple users can share the same communications system resources.

Filter bank multi-carrier (FBMC) is a waveform that offers enhanced spectrum sharing capability due to its good spectrum localization. Faster than Nyquist signaling (FTN) is a waveform that offers high spectrum efficiency.

Waveforms, such as OFDM, SCMA, LDS-OFDM, CDMA-OFDM, FBMC, FITN, and the like, are described in greater detail in co-assigned U.S. patent applications: application Ser. No. 13/730,355, now U.S. Publication No. 2014/0140360, filed Dec. 28, 2012, entitled "Systems and Methods for Sparse Code Multiple Access"; application Ser. No. 14/035,161, now U.S. Publication No. 2014/0233664, filed Sep. 24, 2013, entitled "System and Method for Orthogonal Frequency Division Multiplexing-Offset Quadrature Amplitude Modulation"; and application Ser. No. 14/212,735, now U.S. Publication No. 2015/0263822, filed Mar. 14, 2014, entitled "System and Method for Faster Than Nyquist Transmission," which are hereby incorporated herein by reference.

Several potential waveforms, such as SCMA, LDS, LDS-OFDM, CDMA-OFDM, FTN, FBMC, and the like, have been shown to exhibit some unique advantages over OFDM. As an example, FBMC reduces out-band spectrum leakage and removes the guard band required in OFDM, SCMA and/or LDS may increase the number of users supported, as well as the data throughput for multi-user transmission, while FTN signaling may increase the spectrum efficiency.

A 5G communications system may support one or more those waveforms, along with waveform parameters to implement the different waveforms. Furthermore, it is generally expected for a 5G communications system to support many different traffic types with different QoS requirements, different spectrum usages with different out-of-band leakage requirements, different applications serving different UE, different transmitting device capabilities, different receiving device capabilities, and the like. Therefore, future 5G systems should be flexible enough to provide different services to different devices in different scenarios. An example of realizing multiple radio link access technologies (RAT) is via multi-RAT inter-working, where a UE is configured to switch between different RATs via a network handover. Issues for such mechanism may include long switching time, large signaling overhead, and implementation cost and/or complexity. Generalized multi-carrier frequency division multiplexing (GMFDM) provides such flexibility, where multiple waveforms are dynamically adapted at the physical layer and unified under a single framework.

According to an example embodiment, a 5G communications system supports multiple waveforms in order to support the wide range of requirements and/or capabilities discussed above. Each waveform having a plurality of customizable parameters. The multiple waveforms and associated communications system parameters to specify them may be referred to in general as generalized multi-carrier multiplexing parameters (GMMP). As an illustrative example, GMMP may include: waveform, signaling frequency factor, digital pulse shaping type, spreading factor, overlay factor, spreading sequence type, and the like.

Signaling frequency factor (SFF) is a parameter that characterizes a signaling frequency of consecutive symbols in a waveform relative to a Nyquist rate of the waveform. If the signaling frequency of the symbols is equal to the Nyquist frequency, then SFF=1 and no intersymbol interference (ICI) occurs, while if the signaling frequency is greater than the Nyquist rate, SFF>1 and ICI occurs. Digital pulse shaping type (PST) may be a parameter that characterizes a frequency response of filters used at a transmitter and a receiver of communicating devices. The shape of the frequency response of the filters may have an impact on the amount of out-of-band emissions occurring in the transmissions.

Spreading factor (SF) is a parameter that specifies a number of communications system resource elements (such as sub-carriers, for example) over which a signal is spread. In some situations, the signal is carried in a subset of the communications system resource elements. Overlay factor (OF) is a parameter that characterizes a number of users that can share a layer. Typically, higher OF may allow more users to share a single layer, facilitating support for large numbers of active connections. Spreading sequence type (SST) is a parameter that characterizes a spreading sequence used spread the data into symbols. Usually different waveforms may use different spreading sequences.

The 5G communications system, through the use of waveforms, as specified by the GMMP, may be able to adapt to various conditions to maximize spectral efficiency, number of active links (in other words, number of active users), spectrum sharing, and the like, or combinations thereof. The process of adapting the waveforms to the capabilities and/or requirements of communications equipment may be referred to as GMMP adaptation. GMMP adaptation may select values of one or more GMMP to optimize overall communications system performance. The selection of values of the one or more GMMP allows a GMFDM communications system to obtain a wide range of different waveforms, including OFDM, SCMA, Low Density Signature OFDM (LDS-OFDM), CDMA-OFDM, FBMC, FTN, and the like, as well as combinations thereof, to meet the different capabilities and/or requirements.

GMMP adaptation may be performed in a stand-alone device in the communications system or a unit co-located with another device in the communications system, such as an eNB, a network entity in the communications system, and the like. GMMP adaptation can allow for the modification of the characteristics of a waveform that can provide improved spectral efficiency, out-of-band emission reduction, reduced energy consumption, QoS satisfaction, and the like. According to an example embodiment, GMFDM is provided to enable flexible GMMP adaptation with generalized signal processing at a transmitting device and a receiving device. GMMP adaptation may be performed for a single transmitting device to single receiving device pair, a single transmitting device to a plurality of receiving devices, a plurality of transmitting devices to a single receiving device, or a plurality of transmitting devices to a plurality of receiving devices, to specify a waveform between transmitting device(s) and receiving device(s).

According to an example embodiment, GMMP adaptation is performed for all communications for a single transmitting device(s) and a receiving device(s) group. According to another example embodiment, GMMP adaptation is performed separately for uplink and downlink communications for a single transmitting device(s) and a receiving device(s) group. According to yet another example embodiment, GMMP adaptation is performed separately for a subset of uplink communications or a subset of downlink communications for a single transmitting device(s) and a receiving device(s) group. In other words, GMMP adaptation may be performed on a communications channel level, a direction (either uplink and/or downlink) level, or a transmission level.

Figure 3:
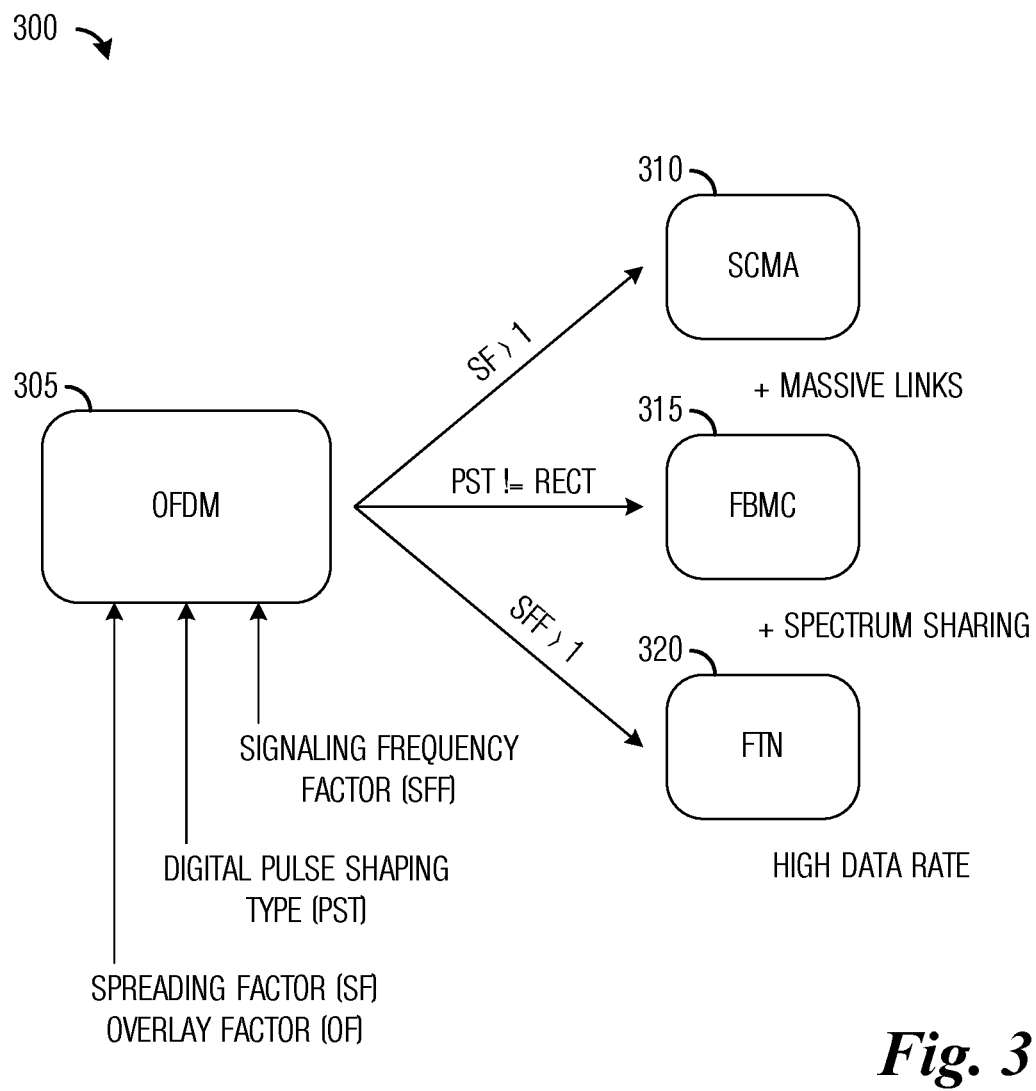
FIG. 3 illustrates a first example waveform configuration overview for a GMFDM communications system according to example embodiments described herein.

FIG. 3 illustrates a first example waveform configuration overview for a GMFDM communications system 300. GMFDM communications system 300 provides, as a baseline, OFDM 305 that trades spectral efficiency (SE) with complexity. GMMP adaptation may be based on adaptation criteria that include content and application, device capability, device requirements, spectrum sharing mechanism, network topology, channel condition, access mechanism, and the like, as examples. In general, GMMP adaptation may select values for one or more of the parameters SFF, PST, SF, OF, SST, and the like, based on adaptation criteria to specify a waveform between transmitting device(s) and receiving device(s) by setting values of GMMP.

A unit performing GMMP adaptation may have as input GMMP, such as SFF, PST, SF, OF, SST, and the like. The unit performing GMMP adaptation may select values for the input GMMP in accordance with the adaptation criteria. As an illustrative example, if the unit performing GMMP adaptation selects SF>1, a waveform may be SCMA 310, which can support large numbers of active connections due to its overloading capability. As another illustrative example, if the unit performing GMMP adaptation selects PST not equal to a rectangular pulse, a resulting waveform may be FBMC 315, which may have advantages when spectrum sharing is a goal. As yet another illustrative example, if the unit performing GMMP adaptation selects SFF>1, a resulting waveform may be FTN 320, which may offer high spectrum efficiency. It is noted that the illustrative examples provided in the discussion highlights only significant GMMP for illustration and that other GMMP may also be selected by the unit performing GMMP adaptation but not illustrated herein to maintain simplicity. Furthermore, it may be possible to select values for more than one GMMP and obtain a resulting waveform that is combination of multiple waveforms. As an illustrative example, GMMP adaptation may select SF>1 and PST not equal to rectangular to obtain a waveform that is a combination of SCMA and FBMC.

Figure 4:
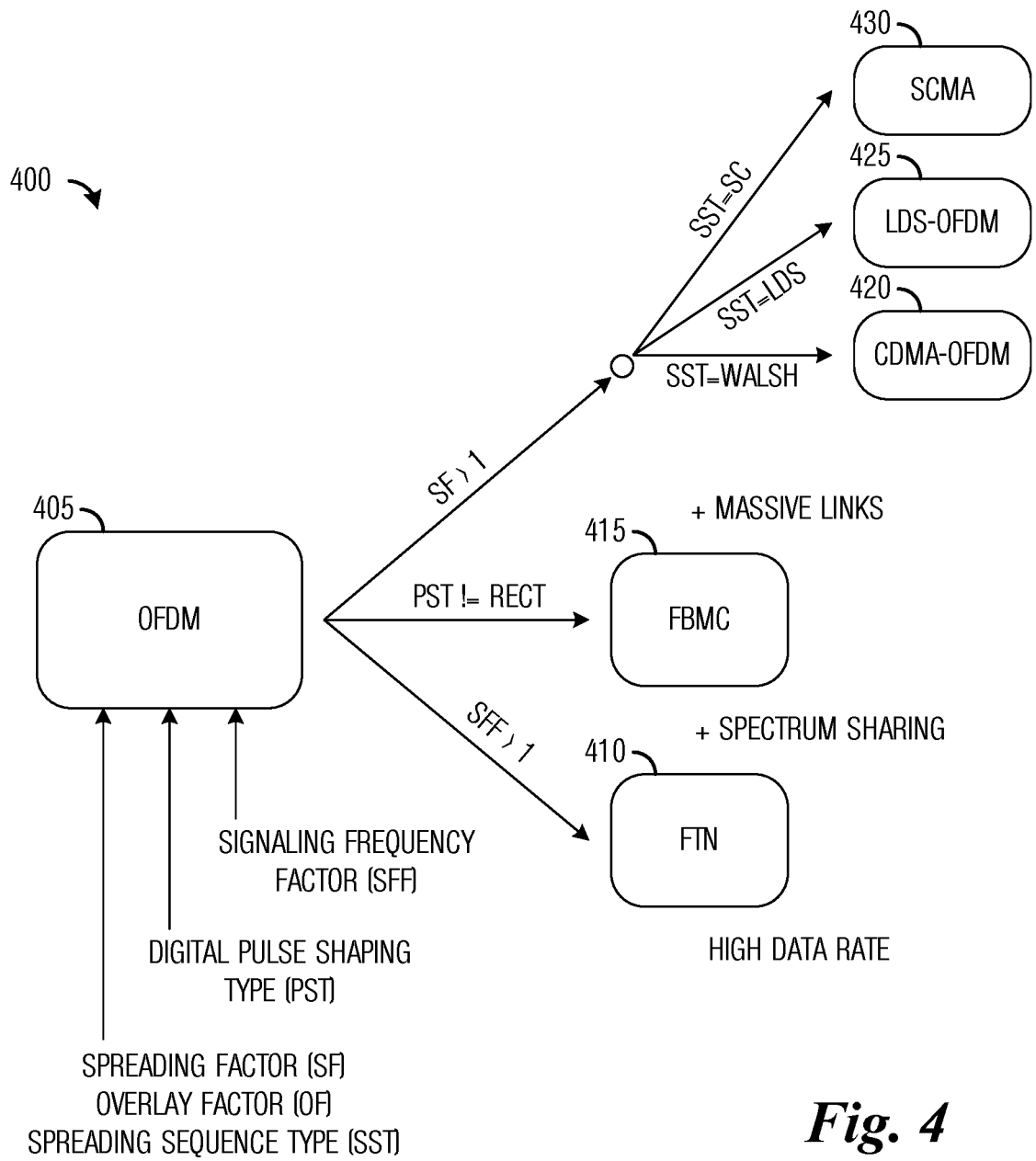
FIG. 4 illustrates a second example waveform configuration overview for a GMFDM communications system according to example embodiments described herein.

FIG. 4 illustrates a second example waveform configuration overview for a GMFDM communications system 400. GMFDM communications system 300 also provides OFDM 405 as a baseline. A unit performing GMMP adaptation may have as input GMMP, such as SFF, PST, SF, OF, SST, and the like. The unit performing GMMP adaptation may values for the input GMMP in accordance with the adaptation criteria. As an illustrative example, if the unit performing GMMP adaptation selects SFF>1, a resulting waveform may be FTN 410. As another illustrative example, if the unit performing GMMP adaptation selects PST not equal to a rectangular pulse, a resulting waveform may be FBMC 415. As yet another illustrative example, if the unit performing GMMP adaptation selects SF>1, a resulting waveform may be CDMA-OFDM 420 if SST is selected as Walsh Codes, LDS-OFDM 425 if SST is selected as LDS, and SCMA 430 if SST is selected as Sparse Code (SC).

As illustrated in FIGS. 3 and 4, the selection of different values for one or more GMMP through GMMP adaptation may result in different waveforms, or it could result in similar waveforms with different characteristics. Therefore, a GMFDM communications system may be able to meet requirements and/or capabilities of different receiving devices and transmitting devices through the use of GMMP adaptation for different receiving device(s) and transmitting device(s) groupings.

Figure 5:
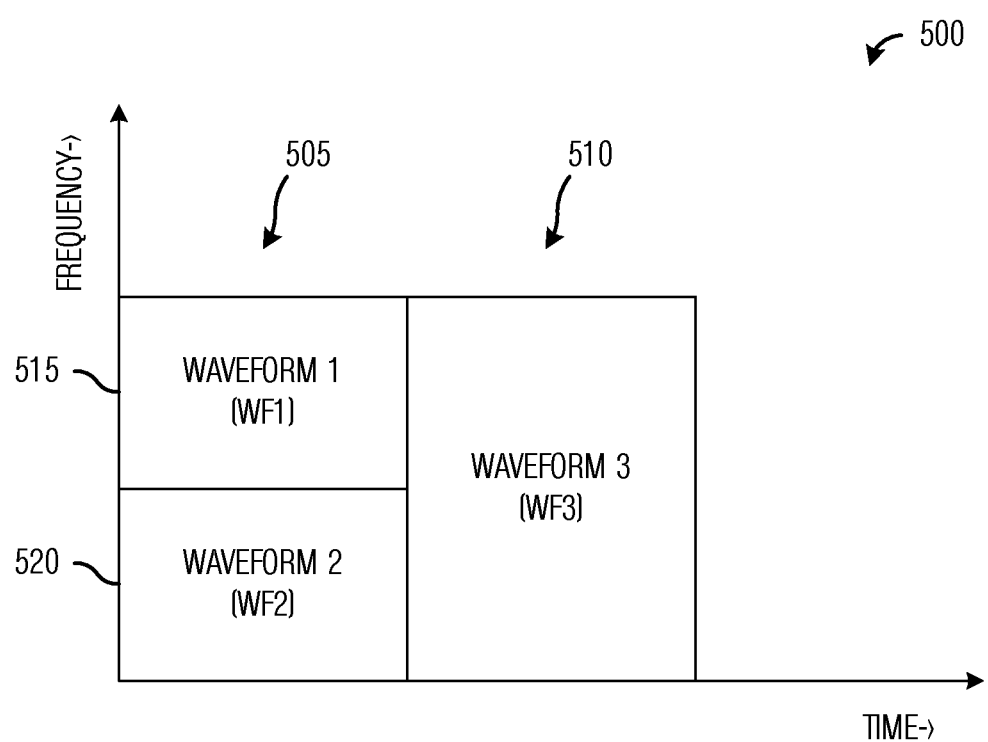
FIG. 5 illustrates an example time-frequency plot of network resources according to example embodiments described herein.

FIG. 5 illustrates an example time-frequency plot 500 of network resources. Time-frequency plot 500 illustrates a plurality of network resources partitioned into frequency bands and time slots. According to an example embodiment, in order to optimize a GMFDM communications system for different receiving device(s) and transmitting device(s) groupings, the GMFDM communications system permits the co-existence of different waveforms. According to an example embodiment, different waveforms may be assigned to different network resource partitions. As an illustrative example, different waveforms may be assigned to different time slots. As shown in FIG. 5, communications using a first waveform WF1 and a second waveform WF2 may be assigned to network resources in a first time slot 505 and communications using a third waveform WF3 may be assigned to network resources in a second time slot 510. As another illustrative example, different waveforms may be assigned to different frequency bands. As shown in FIG. 5, communications using first waveform WF1 may be assigned to frequency band 515 and communications using second waveform WF2 may be assigned to frequency band 520.

The amount of network resources assigned to a particular waveform may be in accordance with factors such as number of receiving device(s) and transmitting device(s) groupings utilizing the waveform, the amount of data being transmitted, the priority of the communications, resource availability, and the like. As shown in FIG. 5, communications using WF3 are assigned the entirety of second time slot 510, while communications using WF1 and WF2 are each assigned about ½ of first time slot 505. It is noted that the partitioning of the network resources shown in FIG. 5 is intended for discussion purposes and that there are many possible ways to partition the network resources. Furthermore, it is possible to support more than 3 waveforms or less than 3 waveforms. Additionally, the assignment of waveforms to network resource partitions may be on a persistent, semi-persistent, or short-term basis.

Figure 6:
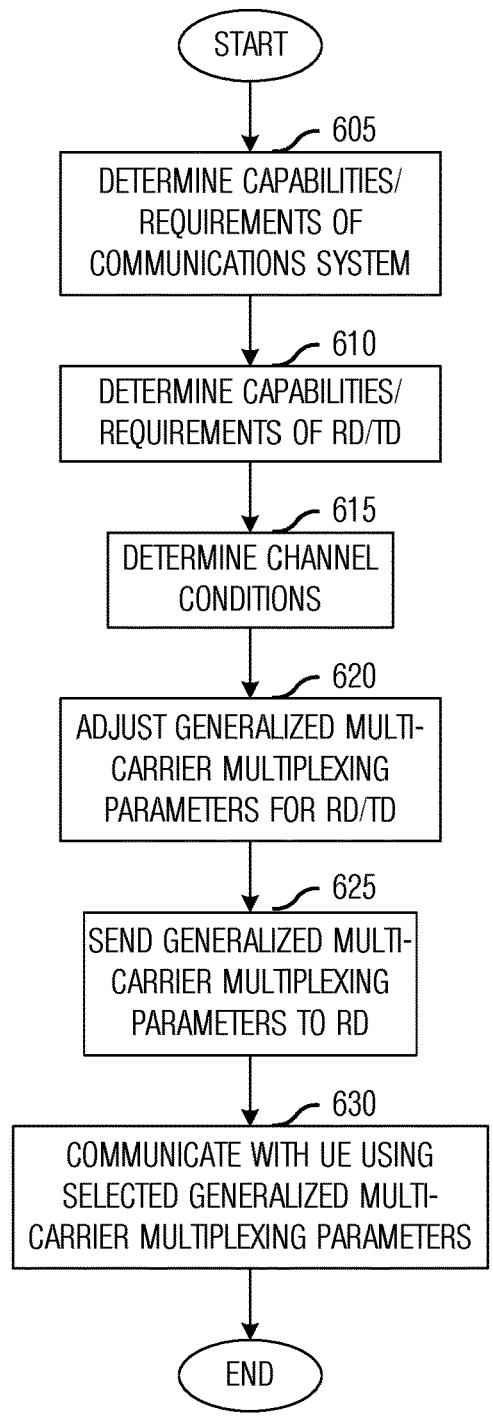
FIG. 6 illustrates a flow diagram of example operations occurring in a transmitting device according to example embodiments described herein.

FIG. 6 illustrates a flow diagram of example operations 600 occurring in a transmitting device. Operations 600 may be indicative of operations occurring in a transmitting device, such as an eNB in a downlink transmission or a UE in an uplink transmission.

Operations 600 may begin with the transmitting device determining capabilities and/or requirements of a communications system (block 605). The capabilities of the communications system may include which values of GMMP the communications system is capable of supporting. As an illustrative example, the communications system may not be able to support SFF>1, or non-rectangular PST. The requirements of the communications system may include out-of-band leakage requirements, spectral efficiency requirements, QoS requirements, the number of connected devices, and the like. The capabilities and/or requirements of the communications system may be pre-specified by an operator of the communications system or a technical standard and stored in a memory. Alternatively, the capabilities and/or requirements of the communications system may be stored in an entity in the communications system and the transmitting device may query the entity to retrieve the capabilities and/or requirements of the communications system.

The transmitting device may determine capabilities and/or requirements of a receiving device(s) (RD) and/or transmitting device(s) (TD) (block 610). The capabilities of the receiving device and/or transmitting device may include support for FTN, FBMC, multiple-input multiple output (MIMO), and the like. The requirements of the receiving device and/or transmitting device may include out-of-band leakage requirements, spectral efficiency requirements, QoS requirements, data bandwidth requirements, the number of connected devices, and the like. The transmitting device may determine channel conditions (block 615). The transmitting device may determine the condition of a communications channel(s) between itself and the receiving device by receiving a report of channel condition from the receiving device or by measuring transmissions made by the receiving device on a reciprocal communications channel.

The transmitting device may perform GMMP adaptation to select values for GMMP for the receiving device and/or transmitting device (block 620). The GMMP adaptation may utilize the capabilities and/or requirements of the communications system, the capabilities and/or requirements of the receiving device and/or transmitting device, the channel condition, and the like, to adjust and/or select values for GMMP for a waveform used for a channel(s) between the transmitting device and the receiving device, a direction (such as uplink or downlink) of the channel(s), or a subset of transmissions on a direction of the channel(s). As discussed previously, different waveforms may be generated by selecting different values for GMMP. As an illustrative example, OFDM may be generated as a combination of GMMPs SFF=1, SF=1, OF=1, PST=Rectangular; FMMC may be generated as a combination of GMMPs SFF=1, SF=1, OF=1, PST=Time-frequency localized orthogonal prototype filter; SCMA may be generated as a combination of GMMPs SFF=1, SF>1, OF>1; FTN may be generated as a combination of GMMP SFF>1; and the like. Furthermore, different waveforms may be combined. As an illustrative example, FBMC and SCMA may be generated as a combination of GMMPs SFF=1, SF>1, OF>1, PST=Time-frequency localized orthogonal prototype filter; FBMC, SCMA, and FTN may be generated as a combination of GMMPs SFF>1, SF>1, OF>1, PST=Time-frequency localized orthogonal prototype filter; and the like.

The transmitting device may send the selected values for GMMP to the receiving device (block 625). According to an example embodiment, the transmitting device may transmit an indicator of the selected values for GMMP to the receiving device. As an illustrative example, a plurality of waveforms or GMMP sets may be predefined by an operator of the communications system or technical standard and stored at the transmitting device and the receiving device. The transmitting device may select a number that corresponds to the selected values for GMMP and send the number to the receiving device. Table 1 illustrates an example waveform table with GMMP values corresponding to candidate waveforms. The transmitting device may send the selected values for GMMP corresponding to a selected candidate waveform to the receiving device by selecting a waveform index (WFI) and transmitting the WFI to the receiving device. The receiving device may simply use the WFI to retrieve the selected values for GMMP. It is noted that although the information is presented in this discussion as a table, the information may also be stored as a list, and the like.

TABLE 1

Waveform and GMMP table.

| WFI | SFF | SF | OF | PST |
|-----|-----|-----|-----|-----|
| 1 | 1 | 1 | 1 | Rectangular |
| 2 | 1 | 1 | 1 | Prototype filter |
| 3 | 1 | >1 | >1 | Rectangular |
| ... | ... | ... | ... | ... |

The transmitting device may communicate with the receiving device using the selected values for GMMP (block 630). According to an example embodiment, the selected values for GMMP may apply to both downlink and uplink communications. According to an alternative example embodiment, different selected values for GMMP may apply to downlink communications and to uplink communications. According to another alternative example embodiment, different selected values for GMMP may apply to one or more transmissions on uplink and/or downlink communications. The transmitting device and/or the receiving device may use network resources scheduled in accordance with the selected values for GMMP, as well as the selected values for GMMP to encode and/or decode the communications. The transmitting device and the receiving device may use the selected values for GMMP to communicate.

According to an alternative example embodiment, blocks 605, 6100, 615, and 620 (or blocks 605, 6100, 615, 620, and 625) may be performed in a designing device, such as designing device 120, rather than a transmitting device. In such a situation, the designing device may be a stand-alone device or it may be co-located with another entity in the communications system. The designing device may select values for the GMMP and send the selected values to the transmitting device and/or the receiving device.

Figure 7:
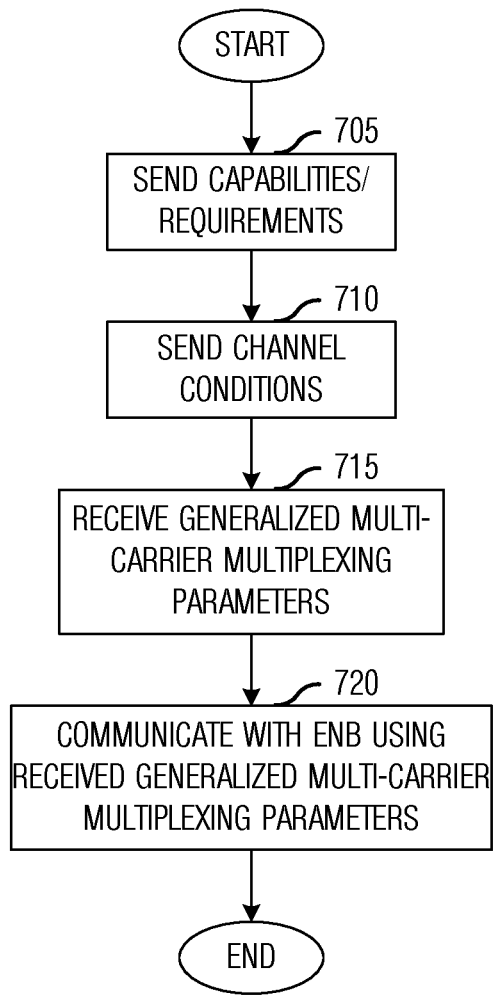
FIG. 7 illustrates a flow diagram of example operations occurring in a receiving device according to example embodiments described herein.

FIG. 7 illustrates a flow diagram of example operations 700 occurring in a receiving device. Operations 700 may be indicative of operations occurring in a receiving device, such as an eNB in an uplink transmission or a UE in a downlink transmission.

Operations 700 may begin with the receiving device sending capabilities and/or requirements (block 705). As an example, the receiving device may send its capabilities and/or requirements to a transmitting device to help the transmitting device select values for GMMP specifying a waveform for a channel between the receiving device and the transmitting device. As an alternative example, the receiving device may send its capabilities and/or requirements to a stand-alone device performing GMMP adaptation, such as designing device 120. As yet another alternative example, the receiving device may send its capabilities and/or requirements to an entity that stores the capabilities and/or requirements of the receiving device and provides the capabilities and/or requirements to a requesting device when queried.

The receiving device may send information about the condition of a communications channel(s) between itself and the transmitting device (block 710). The information may be in form of a report of channel condition. According to an alternative example embodiment, the receiving device may make transmissions to assist the transmitting device make its own assessment of the condition of the communications channel(s).

The receiving device may receive the selected values for GMMP (block 715). As an illustrative example, the receiving device may receive an indicator of the selected values for GMMP from the transmitting device. The indicator may be an index to a table of candidate waveforms with GMMP values corresponding to the waveforms (e.g., as shown in Table 1). The receiving device may have a copy of the table and may make use of the index to retrieve the selected values for GMMP. As an alternative illustrative example, the receiving device may receive an indicator of the selected values for GMMP from a stand-alone device performing GMMP adaptation. The receiving device may use the selected values for GMMP to communicate with the transmitting device (block 720). According to an example embodiment, the selected values for GMMP may apply to both downlink and uplink communications. According to an alternative example embodiment, different selected values for GMMP may apply to downlink communications and to uplink communications. According to another alternative example embodiment, different selected values for GMMP may apply to one or more transmissions on uplink and/or downlink communications.

Figure 8:
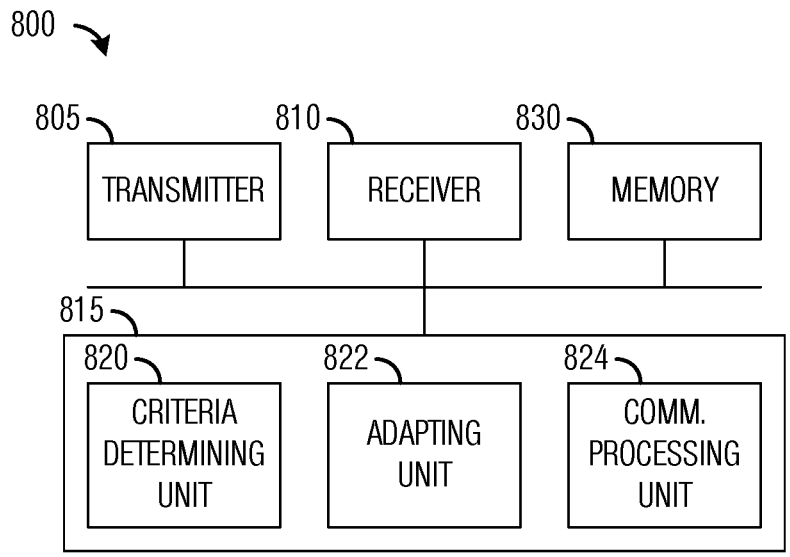
FIG. 8 illustrates an example first communications device according to example embodiments described herein.

FIG. 8 illustrates an example first communications device 800. Communications device 800 may be an implementation of a transmitting device, such as a communications controller, such as an eNB, a base station, a NodeB, a controller, and the like, or a UE, such as a user, a subscriber, a terminal, a mobile, a mobile station, and the like. Communications device 800 may be an implementation of a stand-alone device performing GMMP adaptation, such as designing device 120. Communications device 800 may be used to implement various ones of the embodiments discussed herein. As shown in FIG. 8, a transmitter 805 is configured to transmit packets, selected values for GMMP, indicators of selected values for GMMP, and the like. Communications device 800 also includes a receiver 810 that is configured to receive packets, capabilities, requirements, channel condition reports, selected values for GMMP, indicators of selected values for GMMP, and the like.

A criteria determining unit 820 is configured to determine adaptation criteria that may include one or more of content and application, device capability, device requirements, spectrum sharing mechanism, network topology, channel condition, access mechanism, and the like, as examples. Criteria determining unit 820 is configured to receive the adaptation criteria. Criteria determining unit 820 is configured to process information to generate the adaptation criteria. An adapting unit 822 is configured to perform GMMP adaptation in accordance with the adaptation criteria. Adapting unit 822 is configured to select values for GMMP to configure communications that meet the adaptation criteria. Adapting unit 822 is configured to perform GMMP adaptation for various receiving device(s) and transmitting device(s) groupings. Adapting unit 822 is configured to select an indicator of selected values for GMMP from a waveform table, such as Table 1. A communications processing unit 824 is configured to communicate using the selected values for GMMP. Communications processing unit 824 is configured to adjust transmitter 805 and/or receiver 810 in accordance with the selected values for GMMP. A memory 830 is configured to store adaptation criteria, GMMP, selected values for GMMP, waveform tables, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, receiver 810 and transmitter 805 may be implemented as a specific hardware block, while reliability criteria determining unit 820, adapting unit 822, and communications processing unit 824 may be software modules executing in a microprocessor (such as processor 815) or a custom circuit or a custom compiled logic array of a field programmable logic array. Reliability criteria determining unit 820, adapting unit 822, and communications processing unit 824 may be modules stored in memory 830.

Figure 9:
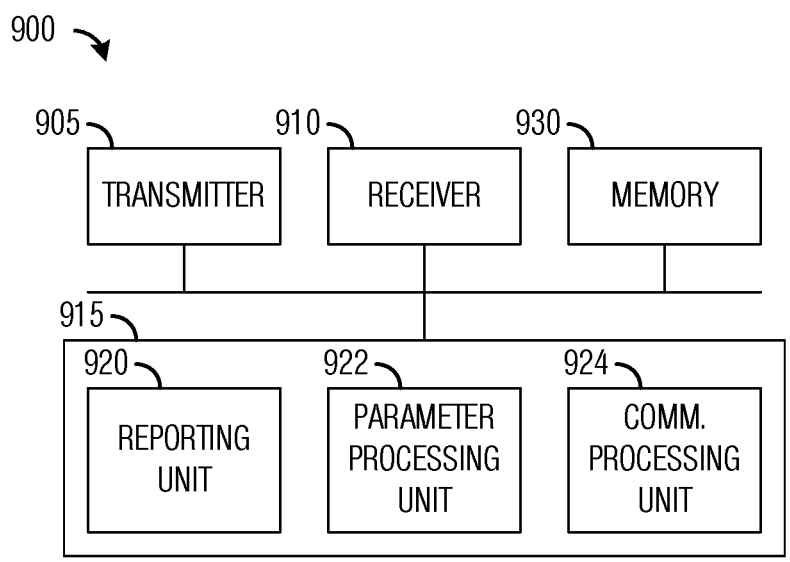
FIG. 9 illustrates an example second communications device according to example embodiments described herein.

FIG. 9 illustrates an example second communications device 900. Communications device 900 may be an implementation of a receiving device, such as a communications controller, such as an eNB, a base station, a NodeB, a controller, and the like, or a UE, such as a user, a subscriber, a terminal, a mobile, a mobile station, and the like. Communications device 900 may be used to implement various ones of the embodiments discussed herein. As shown in FIG. 9, a transmitter 905 is configured to transmit packets, capabilities, requirements, channel condition reports, and the like. Communications device 900 also includes a receiver 910 that is configured to receive packets, selected values for GMMP, indicators of selected values for GMMP, and the like.

A reporting unit 920 is configured to report adaptation criteria that include content and application, device capability, device requirements, spectrum sharing mechanism, network topology, channel condition, access mechanism, and the like, as examples. A parameter processing unit 922 is configured to receive selected values for GMMP for a communications channel involving communications device 900. Parameter processing unit 922 is configured to receive an indicator of selected values for GMMP, and to determine the selected values for GMMP from a waveform table, such as Table 1. A communications processing unit 924 is configured to communicate using the selected values for GMMP. Communications processing unit 924 is configured to adjust transmitter 905 and/or receiver 910 in accordance with the selected values for GMMP. A memory 930 is configured to store adaptation criteria, GMMP, selected values for GMMP, waveform tables, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while reporting unit 920, parameter processing unit 922, and communications processing unit 924 may be software modules executing in a microprocessor (such as processor 915) or a custom circuit or a custom compiled logic array of a field programmable logic array. Reporting unit 920, parameter processing unit 922, and communications processing unit 924 may be modules stored in memory 930.

According to another example embodiment, a GMFDM receiver and a GMFDM transmitter are provided with a unified parameterized architecture.

Figure 10:
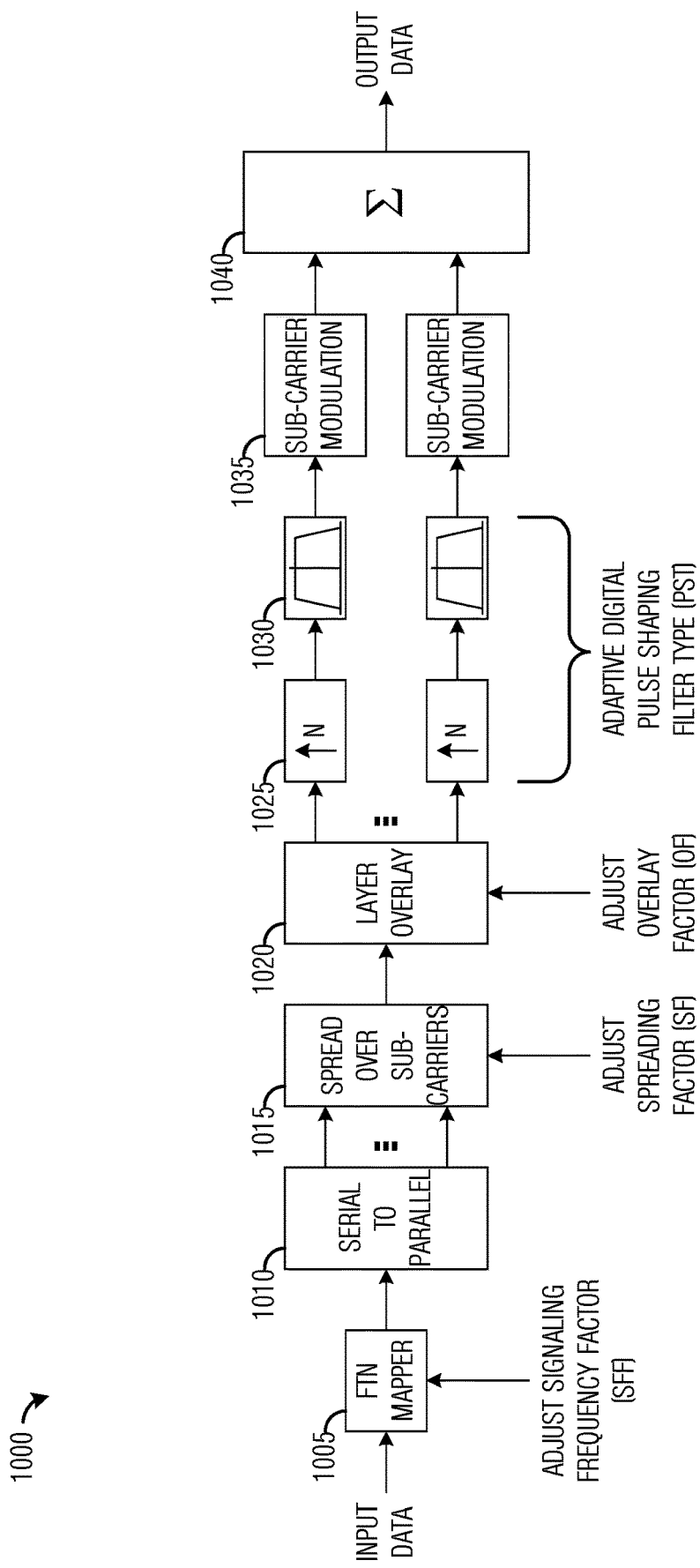
FIG. 10 illustrates an example GMFDM transmitter according to example embodiments described herein.

FIG. 10 illustrates an example GMFDM transmitter 1000. GMFDM transmitter 1000 may be an example implementation of transmitter 805 and transmitter 905. GMFDM transmitter 1000 may be configured in accordance with GMMP corresponding to a waveform. GMFDM transmitter 1000 may include a FTN mapper 1005 that adjusts a signaling frequency factor, i.e., the SFF GMMP. As an example, FTN mapper 1005 may increase the signaling frequency or decrease the signaling frequency of an input data stream relative to the Nyquist frequency. A serial-to-parallel converter 1010 parallelizes the input data stream after it has had its signaling frequency adjusted. A spread over subcarriers unit 1015 may spread the information in the input data stream over multiple sub-carriers, adjusting the spreading factor, i.e., the SF GMMP. A layer overlay unit 1020 may spread the sub-carriers over multiple layers, adjusting the overlay factor, i.e., the OF GMMP. Each of the multiple layers may be provided to an upsampling unit 1025 and a filter 1030. Upsampling unit 1025 and filter 1030 may filter the signal, i.e., applying the PST GMMP. A sub-carrier modulation unit 1035 modulates the sub-carrier. The multiple layers may be combined in a combiner 1040, producing output data to be transmitted.

Figure 11:
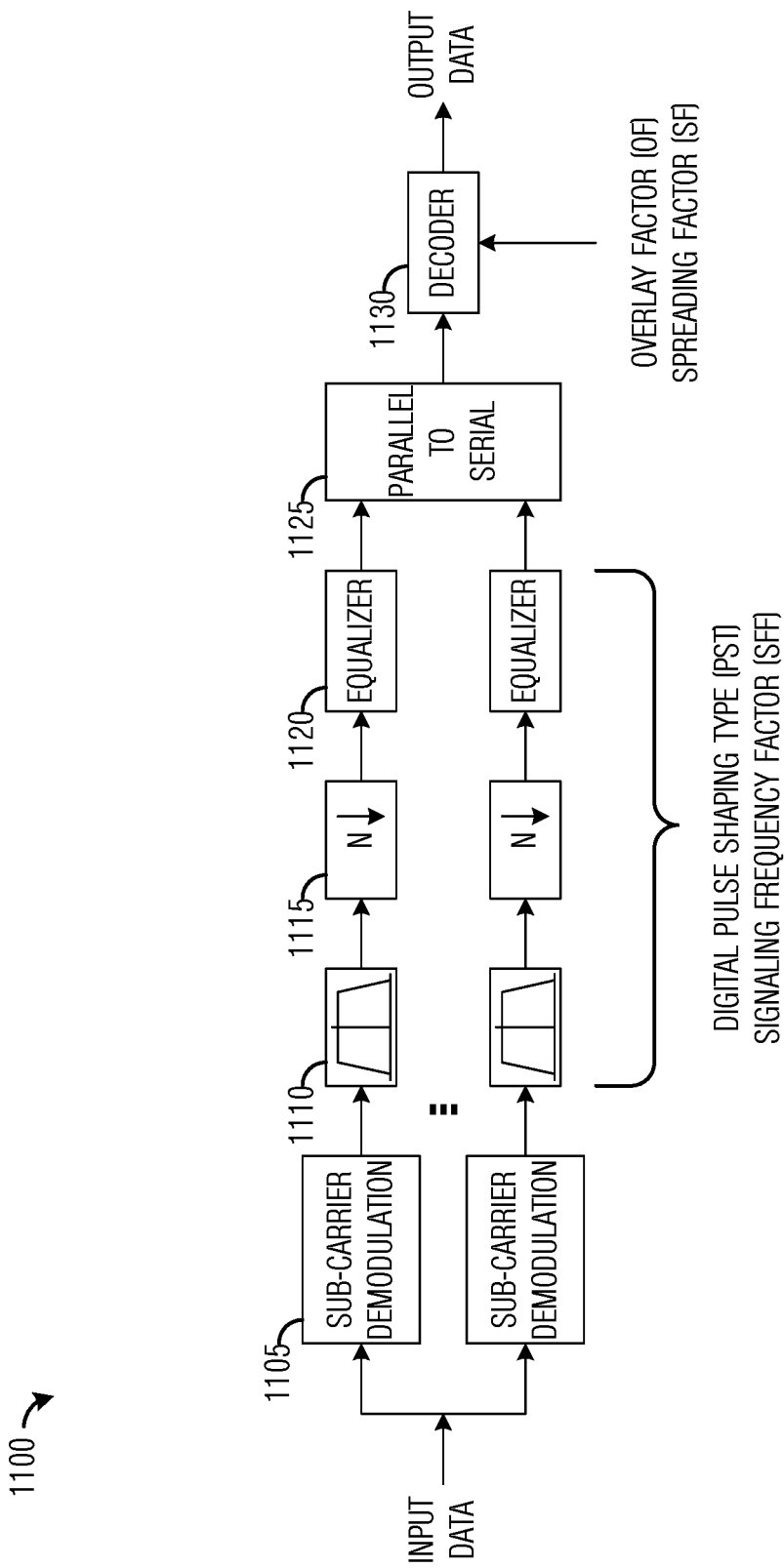
FIG. 11 illustrates an example GMFDM receiver according to example embodiments described herein.

FIG. 11 illustrates an example GMFDM receiver 110000. GMFDM receiver 1100 may be an example implementation of receiver 810 and receiver 910. GMFDM receiver 1100 may be configured in accordance with GMMP corresponding to a waveform. An input signal containing multiple layers is received by GMFDM 1100 and the multiple layers are provided to a plurality of sub-carrier demodulation units, such as sub-carrier demodulation unit 1105 that demodulates the sub-carrier. A filter 1110 filters the information in the sub-carrier and a downsampling unit 1115 downsamples the information. An equalizer 1120 completes processing of individual sub-carriers. Filter 1110, downsampling unit 1115, and equalizer 1120 may adjust PST and SFF GMMP. A parallel-to-serial unit 1125 serializes the information, while a decoder 1130 reconstructs the data transmitted. Decoder 1130 reconstructs the data in accordance with OF and SF GMMP.

Although the present disclosure and its advantages have been described in detail, it should be understood that various changes, substitutions and alterations can be made herein without departing from the spirit and scope of the disclosure as defined by the appended claims.

What is claimed is:

1. A method comprising:
   determining, by a first device, a first waveform assigned to a first cellular resource partition, wherein the first cellular resource partition is one of a plurality of cellular resource partitions including a second cellular resource partition and a third cellular resource partition, wherein the first waveform is the sole waveform determined based on and assigned to the first cellular resource partition, wherein the first waveform comprises first one or more waveform parameters, wherein a second waveform is the sole waveform determined based on and assigned to the second cellular resource partition, wherein a third waveform is the sole waveform determined based on and assigned to the third cellular resource partition, and wherein the first waveform, the second waveform, and the third waveform are different from one another;
   transmitting, by the first device, information associated with the first waveform to a second device; and
   communicating, by the first device with the second device, in the first cellular resource partition using the first waveform.

2. The method of claim 1, further comprising:
   determining, by the first device, the second waveform assigned to the second cellular resource partition, wherein the second waveform comprises second one or more waveform parameters;
   transmitting, by the first device, information associated with the second waveform to a third device; and
   communicating, by the first device with the third device, in the second cellular resource partition using the second waveform.

3. The method of claim 2, wherein the first cellular resource partition comprises a first time slot, and wherein the second cellular resource partition comprises a second time slot different from the first time slot.

4. The method of claim 2, wherein the first cellular resource partition comprises a first frequency band, and wherein the second cellular resource partition comprises a second frequency band different from the first frequency band.

5. The method of claim 2, wherein the first waveform and the second waveform are of different waveform types.

6. The method of claim 2, wherein the first one or more waveform parameters are different from the second one or more waveform parameters.

7. The method of claim 2, further comprising:
determining, by the first device, the third waveform assigned to the third cellular resource partition, wherein the third waveform comprises third one or more waveform parameters, wherein the first cellular resource partition and the third cellular resource partition at least partially overlap in a time domain, and wherein the first cellular resource partition and the third cellular resource partition occupy different frequency bands.

8. The method of claim 1, further comprising:
determining, by the first device, the second waveform assigned to the second cellular resource partition, wherein the second waveform comprises second one or more waveform parameters, wherein the first cellular resource partition and the second cellular resource partition occupy different time slots, and wherein the first cellular resource partition and the second cellular resource partition at least partially overlap in a frequency domain.

9. The method of claim 1,
wherein the first waveform is one of a sparse code multiple access (SCMA) waveform, a low density spreading (LDS) waveform, a LDS-orthogonal frequency division multiplexing (LDS-OFDM) waveform, a CDMA-OFDM waveform, a faster than Nyquist (FTN) waveform, or a filter bank multi-carrier (FBMC) waveform, and
wherein the first one or more waveform parameters include at least one of a signaling frequency factor (SFF) parameter, a spreading factor (SF) parameter, an overlay factor (OF) parameter, a spreading sequence type (SST) parameter, or a pulse shaping type (PST) parameters.

10. A method comprising:
receiving, by a second device from a first device, information associated with a first waveform assigned to a first cellular resource partition, wherein the first cellular resource partition is one of a plurality of cellular resource partitions including a second cellular resource partition and a third cellular resource partition, wherein the first waveform comprises first one or more waveform parameters, wherein the first waveform is the sole waveform determined based on and assigned to the first cellular resource partition, wherein a second waveform is the sole waveform determined based on and assigned to the second cellular resource partition, wherein a third waveform is the sole waveform determined based on and assigned to the third cellular resource partition, and wherein the first waveform, the second waveform, and the third waveform are different from one another; and
communicating, by the second device with the first device, in the first cellular resource partition using the first waveform.

11. The method of claim 10, further comprising:
receiving, by the second device, information associated with the second waveform assigned to the second cellular resource partition, wherein the second waveform comprises second one or more waveform parameters; and
communicating, by the second device with the first device, in the second cellular resource partition using the second waveform.

12. The method of claim 11, wherein the first cellular resource partition comprises a first time slot, and wherein the second cellular resource partition comprises a second time slot different from the first time slot.

13. The method of claim 11, wherein the first cellular resource partition comprises a first frequency band, and wherein the second cellular resource partition comprises a second frequency band different from the first frequency band.

14. The method of claim 11, wherein the first waveform and the second waveform are of different waveform types.

15. The method of claim 11, wherein the first one or more waveform parameters are different from the second one or more waveform parameters.

16. The method of claim 11, wherein the third waveform assigned to the third cellular resource partition comprises third one or more waveform parameters, wherein the first cellular resource partition and the third cellular resource partition at least partially overlap in a time domain, and wherein the first cellular resource partition and the third cellular resource partition occupy different frequency bands.

17. The method of claim 10, wherein the second waveform assigned to the second cellular resource partition comprises second one or more waveform parameters, wherein the first cellular resource partition and the second cellular resource partition occupy different time slots, and wherein the first cellular resource partition and the second cellular resource partition at least partially overlap in a frequency domain.

18. A first device comprising:
one or more processors;
a non-transitory computer readable storage device having instructions stored thereon that, when executed by the one or more processors, cause the first device to perform operations comprising:
determining a first waveform assigned to a first cellular resource partition, wherein the first cellular resource partition is one of a plurality of cellular resource partitions including a second cellular resource partition and a third cellular resource partition, wherein the first waveform is the sole waveform determined based on and assigned to the first cellular resource partition, wherein the first waveform comprises first one or more waveform parameters, wherein a second waveform is the sole waveform determined based on and assigned to the second cellular resource partition, wherein a third waveform is the sole waveform determined based on and assigned to the third cellular resource partition, and wherein the first waveform, the second waveform, and the third waveform are different from one another;
transmitting information associated with the first waveform to a second device; and
communicating, with the second device, in the first cellular resource partition using the first waveform.

19. The first device of claim 18, the operations further comprising:
determining the second waveform assigned to the second cellular resource partition, wherein the second waveform comprises second one or more waveform parameters;
transmitting information associated with the second waveform to a third device; and
communicating, with the third device, in the second cellular resource partition using the second waveform.

20. A second device comprising:
one or more processors;
a non-transitory computer readable storage device having instructions stored thereon that, when executed by the one or more processors, cause the second device to perform operations comprising:
  receiving, from a first device, information associated with a first waveform assigned to a first cellular resource partition, wherein the first cellular resource partition is one of a plurality of cellular resource partitions including a second cellular resource partition and a third cellular resource partition, wherein the first waveform comprises first one or more waveform parameters, wherein the first waveform is the sole waveform determined based on and assigned to the first cellular resource partition, wherein a second waveform is the sole waveform determined based on and assigned to the second cellular resource partition, wherein a third waveform is the sole waveform determined based on and assigned to the third cellular resource partition, and wherein the first waveform, the second waveform, and the third waveform are different from one another; and
  communicating, with the first device, in the first cellular resource partition using the first waveform.

21. The second device of claim 20, the operations further comprising:
  receiving information associated with the second waveform assigned to the second cellular resource partition, wherein the second waveform comprises second one or more waveform parameters; and
  communicating, with the first device, in the second cellular resource partition using the second waveform.

* * * * *